(12) United States Patent
Matlock

(10) Patent No.: US 9,821,830 B1
(45) Date of Patent: Nov. 21, 2017

(54) COVERED WHEELBARROW SYSTEM

(71) Applicant: Janelle Matlock, Fulton, NY (US)

(72) Inventor: Janelle Matlock, Fulton, NY (US)

( * ) Notice: Subject to any disclaimer, the term of this patent is extended or adjusted under 35 U.S.C. 154(b) by 0 days.

(21) Appl. No.: 15/162,034

(22) Filed: May 23, 2016

(51) Int. Cl.
  *B62B 1/20* (2006.01)
  *B62B 5/00* (2006.01)

(52) U.S. Cl.
  CPC .............. *B62B 5/0013* (2013.01); *B62B 1/20* (2013.01)

(58) Field of Classification Search
  CPC ....... B62B 5/0013; B62B 1/20; B65F 1/1468; B65F 1/1473; B65F 1/1615; B65F 1/1638; B65F 1/1646; B60P 7/02; B60P 3/426
  USPC ...................................................... 280/47.32
  See application file for complete search history.

(56) References Cited

U.S. PATENT DOCUMENTS

| | | | |
|---|---|---|---|
| 1,769,271 A | 7/1930 | Parsons | |
| 3,759,415 A * | 9/1973 | Cloyd | B65D 43/0212 220/324 |
| 4,279,357 A * | 7/1981 | Robinson | B65F 1/1615 220/318 |
| 4,450,976 A * | 5/1984 | Snyder | B65F 1/1468 220/844 |
| 4,836,394 A * | 6/1989 | Glomski | B65F 1/1646 220/263 |
| 4,972,966 A * | 11/1990 | Craft, Jr. | B65F 1/06 220/263 |
| 5,261,562 A * | 11/1993 | Prout | B65F 1/1468 220/771 |
| 5,323,923 A * | 6/1994 | Schauer | B65D 43/24 220/756 |
| 5,356,027 A * | 10/1994 | Craft | B65F 1/1646 16/257 |
| 5,385,259 A * | 1/1995 | Bernstein | B65F 1/06 220/212.5 |
| 5,564,586 A * | 10/1996 | Goodwin | B65F 1/1646 16/DIG. 13 |
| D377,253 S * | 1/1997 | Presnell | D34/11 |
| D389,451 S | 1/1998 | Wilson | |
| 5,921,389 A | 7/1999 | Zoffer | |
| 5,975,345 A * | 11/1999 | Taylor | B65F 1/16 220/826 |
| 6,036,204 A * | 3/2000 | Craft | B65F 1/1468 220/762 |
| 6,053,354 A * | 4/2000 | Niemeyer | B65F 1/1473 220/819 |
| 6,547,309 B1 | 4/2003 | Franklin et al. | |
| 7,086,557 B2 * | 8/2006 | Miller | B65F 1/16 220/836 |
| 7,100,791 B2 * | 9/2006 | Berger | B65F 1/122 220/380 |
| 8,186,539 B2 * | 5/2012 | Lin | B65F 1/1607 220/263 |
| 8,360,445 B2 * | 1/2013 | Meers | B65F 1/16 220/318 |

(Continued)

*Primary Examiner* — J. Allen Shriver, II
*Assistant Examiner* — Brian Cassidy

(57) ABSTRACT

A covered wheelbarrow system includes a wheelbarrow that has a bucket. A lid is hingedly coupled to the wheelbarrow. The lid is positioned to selectively close the bucket to inhibit material from being removed from the bucket. The lid is positioned in an open position to facilitate the material to be removed from the bucket. A pair of hinges is provided and each of the hinges is coupled to the lid. Each of the hinges releasably engages the bucket such that the lid is removably coupled to the wheelbarrow.

6 Claims, 5 Drawing Sheets

(56) References Cited

U.S. PATENT DOCUMENTS

Figure 1:
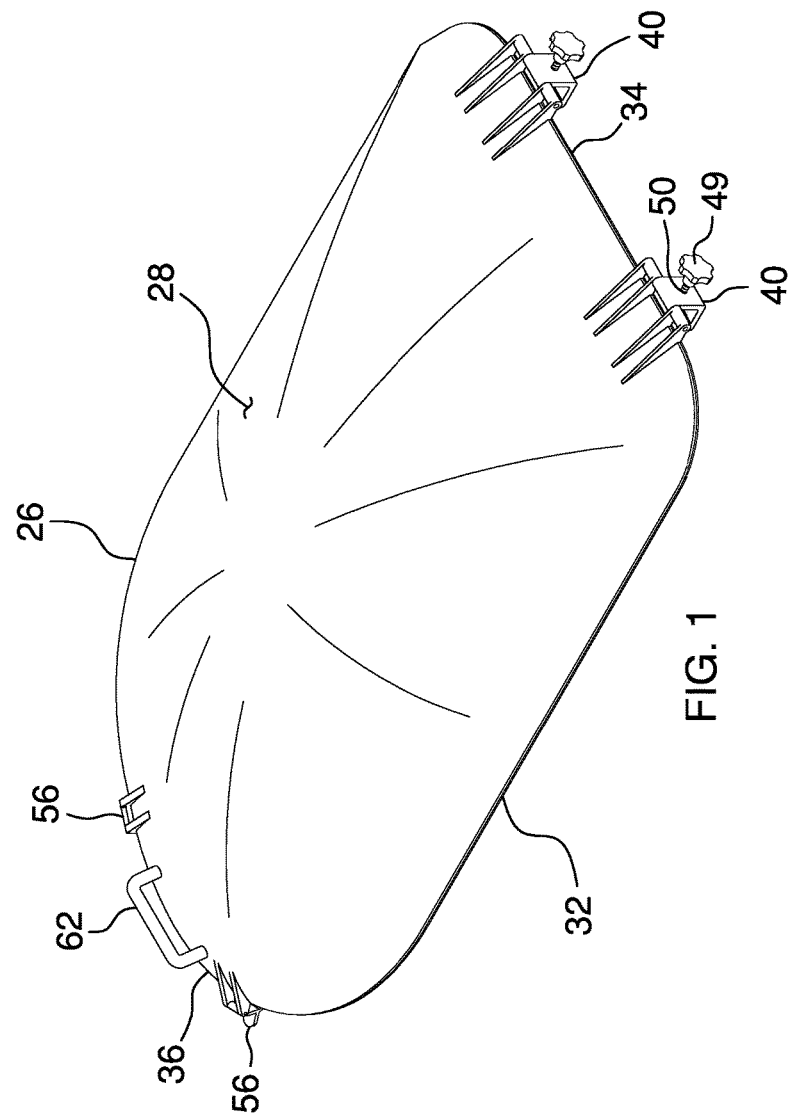

| | | | | |
|---|---|---|---|---|
| 8,366,156 B2* | 2/2013 | Mercier | ............... | B65F 1/02 |
| | | | | 292/195 |
| 8,424,715 B2* | 4/2013 | Aiken | ............... | B65F 1/1468 |
| | | | | 220/761 |
| 8,479,949 B2* | 7/2013 | Henkel | ............ | B65F 1/1615 |
| | | | | 220/324 |
| 8,636,289 B2 | 1/2014 | Skijus et al. | | |
| 8,714,404 B2* | 5/2014 | Raghunathan | ........ | B65F 1/1468 |
| | | | | 220/759 |
| 8,997,658 B2 | 4/2015 | Pipkorn et al. | | |
| 2003/0155366 A1* | 8/2003 | Raghunathan | ........ | B65F 1/1473 |
| | | | | 220/835 |
| 2007/0175910 A1* | 8/2007 | Hogarth | ............ | B65F 1/1615 |
| | | | | 220/835 |
| 2011/0139038 A1* | 6/2011 | Pipkorn | ............... | B62B 1/20 |
| | | | | 108/25 |
| 2011/0155755 A1* | 6/2011 | Lin | ................. | B65F 1/1607 |
| | | | | 220/830 |
| 2011/0266296 A1* | 11/2011 | Curotto | ............ | B65F 1/1638 |
| | | | | 220/810 |
| 2012/0074158 A1* | 3/2012 | Lafleur | ............... | B25H 3/02 |
| | | | | 220/810 |
| 2015/0253055 A1* | 9/2015 | Tsui | ................. | B65D 21/086 |
| | | | | 62/62 |
| 2015/0291078 A1* | 10/2015 | Carrillo, Jr. | ......... | B60P 3/426 |
| | | | | 296/100.02 |
| 2016/0207468 A1* | 7/2016 | Fesenmyer | ........... | B60R 7/04 |

* cited by examiner

COVERED WHEELBARROW SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98.

The disclosure and prior art relates to wheelbarrow devices and more particularly pertains to a new wheelbarrow device for providing a removable lid for a wheelbarrow.

BRIEF SUMMARY OF THE INVENTION

An embodiment of the disclosure meets the needs presented above by generally comprising a wheelbarrow that has a bucket. A lid is hingedly coupled to the wheelbarrow. The lid is positioned to selectively close the bucket to inhibit material from being removed from the bucket. The lid is positioned in an open position to facilitate the material to be removed from the bucket. A pair of hinges is provided and each of the hinges is coupled to the lid. Each of the hinges releasably engages the bucket such that the lid is removably coupled to the wheelbarrow.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

Figure 2:
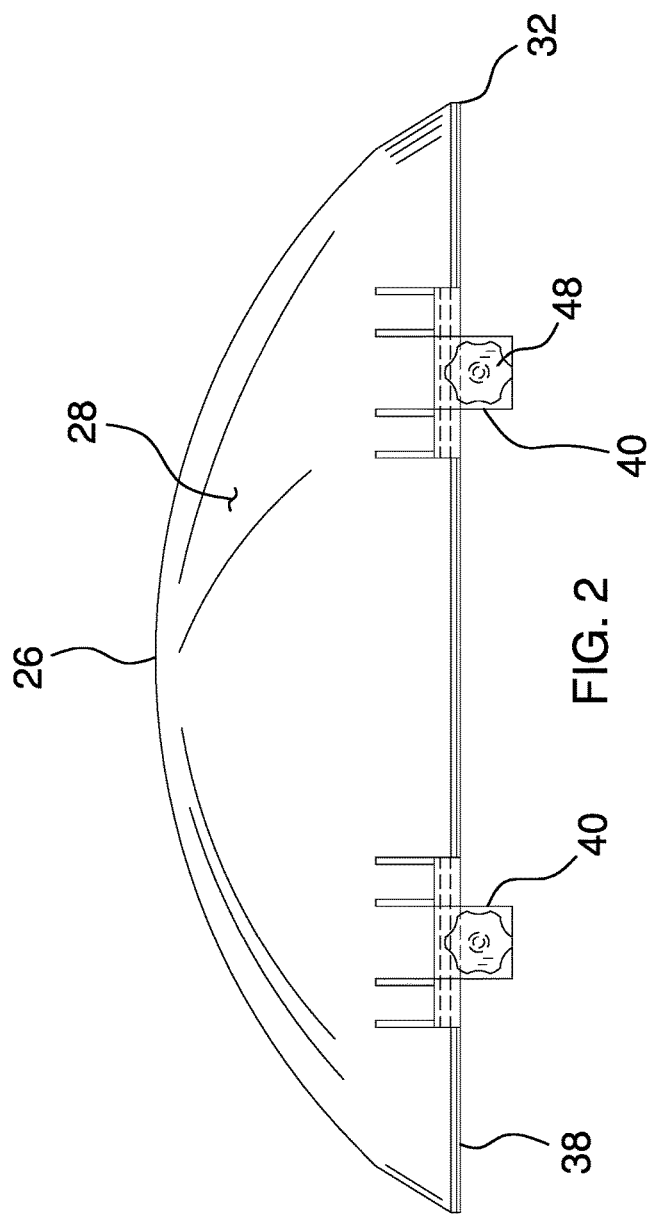
Figure 3:
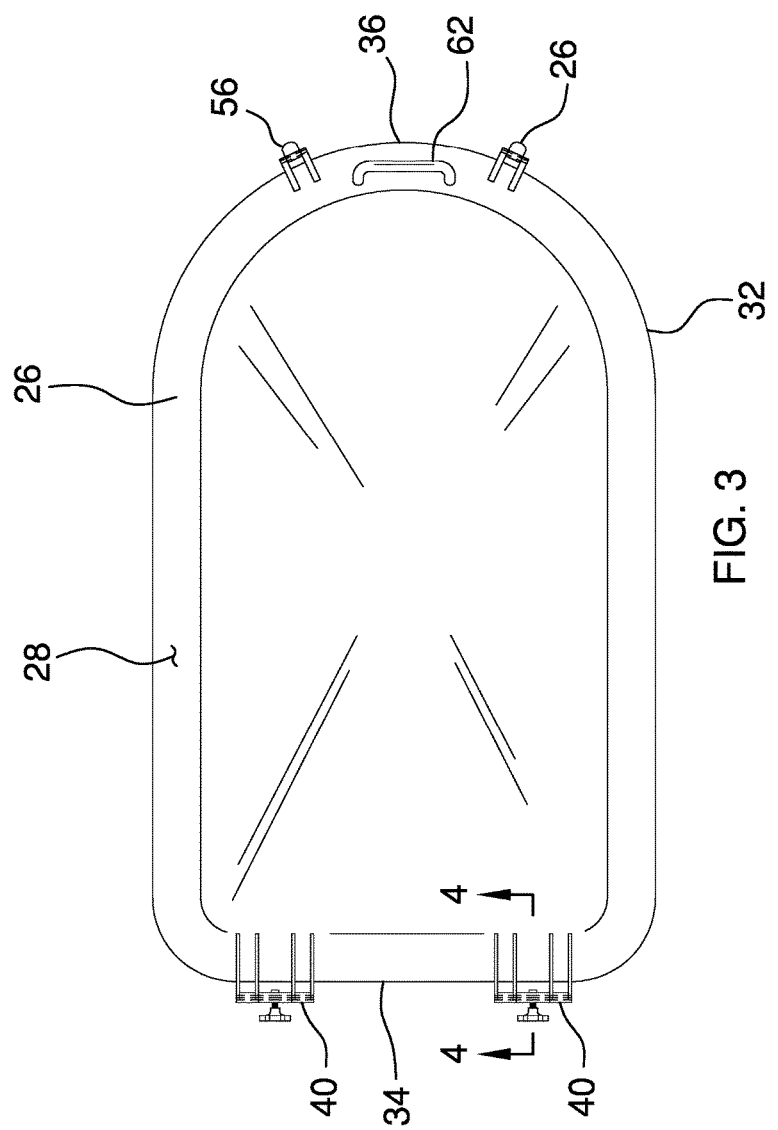
Figure 4:
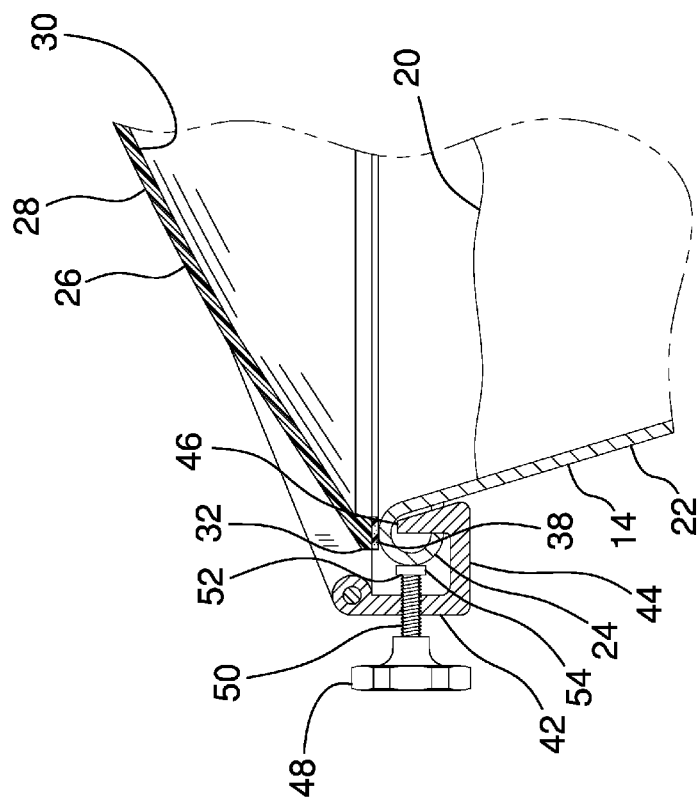
Figure 5:
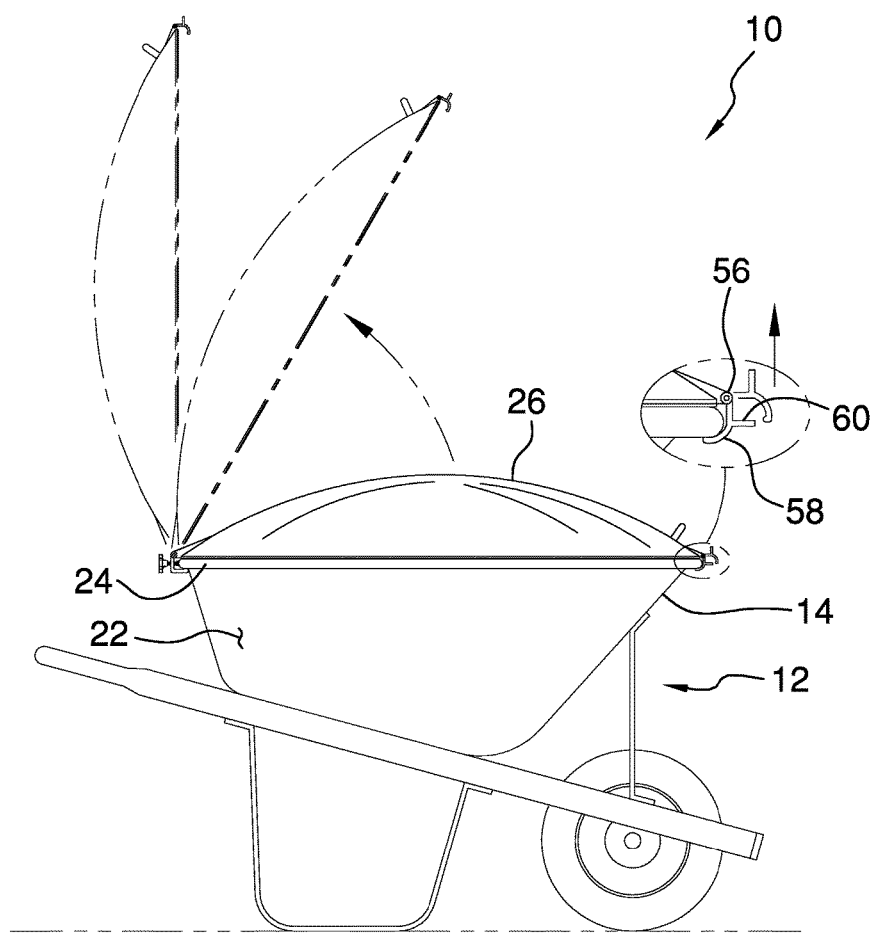

The disclosure will be better understood and objects other than those set forth above will become apparent when consideration is given to the following detailed description thereof. Such description makes reference to the annexed drawings wherein:

FIG. 1 is a top perspective view of a covered wheelbarrow system according to an embodiment of the disclosure.
FIG. 2 is a back view of an embodiment of the disclosure.
FIG. 3 is a top view of an embodiment of the disclosure.
FIG. 4 is a cross sectional view taken along line 4-4 of FIG. 3 of an embodiment of the disclosure.
FIG. 5 is a perspective in-use view of an embodiment of the disclosure.

DETAILED DESCRIPTION OF THE INVENTION

With reference now to the drawings, and in particular to FIGS. 1 through 5 thereof, a new wheelbarrow device embodying the principles and concepts of an embodiment of the disclosure and generally designated by the reference numeral 10 will be described.

As best illustrated in FIGS. 1 through 5, the covered wheelbarrow system 10 generally comprises a wheelbarrow 12 that has a bucket 14. The bucket 14 has an outer wall 16 and a perimeter edge 18. The bucket 14 may contain a material 20 such as leaves, dirt or other material. The outer wall 16 is rolled downwardly along an outer surface 22 of the outer wall 16 to define a lip 24 extending around the bucket 14. Additionally, the perimeter edge 18 is spaced from the outer wall 16. The wheelbarrow 12 may be a wheelbarrow of any conventional design.

A lid 26 is provided and the lid 26 is hingedly coupled to the wheelbarrow 12. The lid 26 is positioned to selectively close the bucket 14 to inhibit the material 20 from being removed from the bucket 14. The lid 26 is positioned in an open position to facilitate the material 20 to be removed from the bucket 14.

The lid 26 has a top surface 28, a bottom surface 30 and a peripheral edge 32 extending therebetween. Each of the top surface 28 and the bottom surface 30 is concavely arcuate between the peripheral edge 32. Thus, the lid 26 forms a dome thereby facilitating the bucket 14 to be completely filled. The bottom surface 30 abuts the lip 24 on the wheelbarrow 12 when the lid 26 is closed. The peripheral edge 32 has a first side 34 that is spaced from a second side 36. The lid 26 may be manufactured such that the peripheral edge 32 of the lid 26 is coextensive with the lip 24 on the bucket 14.

A gasket 38 is coupled to the lid 26 and the gasket 38 is positioned on the bottom surface 30. The gasket 38 is coextensive with the peripheral edge 32 of the lid 26. The gasket 38 is compressed between the lid 26 and the bucket 14 when the lid 26 is closed. Thus, the gasket 38 may form a fluid impermeable seal between the lid 26 and the bucket 14. The gasket 38 may be comprised of a resiliently compressible material such as rubber or the like.

A pair of hinges 40 is provided and each of the hinges 40 is coupled to the lid 26. Each of the hinges 40 releasably engages the bucket 14 such that the lid 26 is removably coupled to the wheelbarrow 12. Each of the hinges 40 is positioned on the first side 34 of the lid 26 and the hinges 40 are spaced apart from each other.

Each of the hinges 40 comprises a leg 42 that is hingedly coupled to the first side 34 and a foot 44 that is coupled to the leg 42. A tab 46 is coupled to the foot 44 and the tab 46 is spaced from the leg 42. The tab 46 extends upwardly from the foot 44. Moreover, the tab 46 is selectively positioned between the outer wall 16 and the perimeter edge 18 of the bucket 14.

A knob 48 is threadably coupled to the leg 42 and the knob may be manipulated. The knob 48 has a shaft 50 extending through the leg 42. The shaft 50 has a distal end 52 with respect to the knob 48. A stopper 54 is coupled to the distal end 52. The stopper 54 frictionally engages the lip 24 when the knob 48 is tightened. Thus, the lid 26 is removably retained on the bucket 14.

Each of the hinges 40 may comprise indexed hinges or the like. Thus, each of the hinges 40 may retain the lid 26 at one of a pair of selected angles with respect to the bucket 14 when the lid 26 is in the open position. The pair of selected angles may be a ninety degree angle and a sixty degree angle.

A pair of latches 56 is provided. Each of the latches 56 is hingedly coupled to the lid 26 and each of the latches 56 may be manipulated. Each of the latches 56 selectively engages the bucket 14 such that the lid 26 is retained in the closed position. Each of the latches 56 is positioned on the top surface 28 and each of the latches 56 is positioned on the second side 36. Each of the latches 56 may comprise a curved member 58 and a grip 60 coupled to the curved member 58.

A handle 62 is coupled to the lid 26. The handle 62 may be manipulated. The handle 62 is positioned on the top surface 28. The handle 62 may be positioned between the pair of latches 56.

In use, the lid 26 is positioned in the open position and the material 20 is placed in the bucket 14. The lid 26 is closed to inhibit the material 20 from being removed from the bucket 14 due to tipping the wheelbarrow 12 or the like. Each of the latches 56 is manipulated to retain the lid 26 in the closed position. The lid 26 is positioned in the open position to remove the material 20 from the wheelbarrow 12. The knob 48 corresponding to each hinge 40 is loosened to facilitate the tab 46 to be urged outwardly from between the perimeter edge 18 and the outer wall 16 of the bucket 14. Thus, the lid 26 is removed from the wheelbarrow 12.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A covered wheelbarrow system comprising:
   a wheelbarrow having a bucket, said bucket being configured to contain a material, said wheelbarrow having a lip;
   a lid being hingedly coupled to said wheelbarrow, said lid being positioned to selectively close said bucket wherein said lid is configured to inhibit the material from being removed from said bucket, said lid being positioned in an open position wherein said lid is configured to facilitate the material to be removed from said bucket, said lid has a top surface, a bottom surface and a peripheral edge extending therebetween, said top surface being convex and said bottom surface being concavely arcuate between said peripheral edge such that said lid forms a dome wherein said lid is configured to facilitate said bucket to be completely filled, said bottom surface abutting said lip on said wheelbarrow when said lid is closed, said peripheral edge having a first side being spaced from a second side; and
   a pair of hinges, each of said hinges being coupled to said lid, each of said hinges releasably engaging said bucket such that said lid is removably coupled to said wheelbarrow, wherein each of said hinges comprises
      a leg being hingedly coupled to said first side,
      a foot being coupled to said leg,
      a tab being coupled to said foot, said tab being spaced from said leg, said tab being positioned between said outer wall of said bucket and said perimeter edge,
      a knob being threadably coupled to said leg wherein said knob is configured to be manipulated, said knob having a shaft extending through said leg, said shaft having a distal end with respect to said knob, and
      a stopper being coupled to said distal end, said stopper frictionally engaging said lip when said knob is tightened such that said lid is removably retained on said bucket.

2. The system according to claim 1, wherein said bucket has an outer wall and a perimeter edge, said perimeter edge being rolled downwardly to define a lip extending around said bucket.

3. The system according to claim 1, further comprising a gasket being coupled to said lid, said gasket being positioned on said bottom surface, said gasket being coextensive with said peripheral edge of said lid, said gasket being compressed between said lid and said bucket when said lid is closed wherein said gasket is configured to form a fluid impermeable seal between said lid and said bucket.

4. The system according to claim 1, further comprising a pair of latches, each of said latches being hingedly coupled to said lid wherein each of said latches is configured to be manipulated, each of said latches selectively engaging said bucket such that said lid is retained in said closed position, each of said latches being positioned on said second side.

5. The system according to claim 1, further comprising a handle being coupled to said lid wherein said handle is configured to be manipulated, said handle being positioned on said top surface.

6. A covered wheelbarrow system comprising:
   a wheelbarrow having a bucket, said bucket having an outer wall and a perimeter edge, said bucket being configured to contain a material, said perimeter edge being rolled downwardly to define a lip extending around said bucket;
   a lid being hingedly coupled to said wheelbarrow, said lid being positioned to selectively close said bucket wherein said lid is configured to inhibit the material from being removed from said bucket, said lid being positioned in an open position wherein said lid is configured to facilitate the material to be removed from said bucket, said lid having a top surface, a bottom surface and a peripheral edge extending therebetween, said top surface being convex and said bottom surface being concavely arcuate between said peripheral edge such that said lid forms a dome wherein said lid is configured to facilitate said bucket to be completely filled, said bottom surface abutting said lip on said wheelbarrow when said lid is closed, said peripheral edge having a first side being spaced from a second side;

a gasket being coupled to said lid, said gasket being positioned on said bottom surface, said gasket being coextensive with said peripheral edge of said lid, said gasket being compressed between said lid and said bucket when said lid is closed wherein said gasket is configured to form a fluid impermeable seal between said lid and said bucket;

a pair of hinges, each of said hinges being coupled to said lid, each of said hinges releasably engaging said bucket such that said lid is removably coupled to said wheelbarrow, each of said hinges being positioned on said first side of said lid, said hinges being spaced apart from each other, each of said hinges comprising:

a leg being hingedly coupled to said first side, a foot being coupled to said leg, a tab being coupled to said foot, said tab being spaced from said leg, said tab being positioned between said outer wall of said bucket and said perimeter edge, and a knob being threadably coupled to said leg wherein said knob is configured to be manipulated, said knob having a shaft extending through said leg, said shaft having a distal end with respect to said knob, and a stopper being coupled to said distal end, said stopper frictionally engaging said lip when said knob is tightened such that said lid is removably retained on said bucket; and a pair of latches, each of said latches being hingedly coupled to said lid wherein each of said latches is configured to be manipulated, each of said latches selectively engaging said bucket such that said lid is retained in said closed position, each of said latches being positioned on said second side; and a handle being coupled to said lid wherein said handle is configured to be manipulated, said handle being positioned on said top surface.

* * * * *